US008270722B2

(12) United States Patent
Ito et al.

(10) Patent No.: US 8,270,722 B2
(45) Date of Patent: Sep. 18, 2012

(54) IMAGE PROCESSING WITH PREFERENTIAL VECTORIZATION OF CHARACTER AND GRAPHIC REGIONS

(75) Inventors: Naoki Ito, Tokyo (JP); Tomotoshi Kanatsu, Tokyo (JP); Taeko Yamazaki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 341 days.

(21) Appl. No.: 12/702,810

(22) Filed: Feb. 9, 2010

(65) Prior Publication Data

US 2010/0202025 A1    Aug. 12, 2010

(30) Foreign Application Priority Data

Feb. 10, 2009  (JP) ................. 2009-028583

(51) Int. Cl.
G06K 9/46 (2006.01)
G06K 9/34 (2006.01)
G06K 9/00 (2006.01)

(52) U.S. Cl. ........................ 382/190; 382/178
(58) Field of Classification Search .................. 382/164, 382/166, 173, 176–178, 181, 182, 190, 197, 382/202, 245; 358/1.5, 1.9, 426.13, 448; 345/428, 619, 641
See application file for complete search history.

(56) References Cited

U.S. PATENT DOCUMENTS

| 4,821,336 | A | * | 4/1989 | Roye | 382/245 |
| 5,111,514 | A | * | 5/1992 | Ohta | 382/177 |
| 5,293,429 | A | * | 3/1994 | Pizano et al. | 382/202 |
| 5,347,624 | A | * | 9/1994 | Takanashi et al. | 345/641 |
| 6,549,676 | B1 | | 4/2003 | Nakayama et al. | 382/246 |
| 6,560,365 | B1 | | 5/2003 | Nakayama et al. | 382/233 |
| 6,567,562 | B1 | | 5/2003 | Nakayama et al. | 382/246 |
| 6,711,295 | B2 | | 3/2004 | Nakayama et al. | 382/232 |
| 6,768,819 | B2 | | 7/2004 | Yamazaki et al. | 382/240 |
| 7,106,911 | B2 | | 9/2006 | Ohta et al. | 382/251 |
| 7,158,669 | B2 | | 1/2007 | Tanaka et al. | 382/166 |
| 7,194,140 | B2 | | 3/2007 | Ito et al. | 382/251 |
| 7,227,998 | B2 | | 6/2007 | Nakayama et al. | 382/232 |
| 7,257,264 | B2 | | 8/2007 | Nakayama et al. | 382/239 |
| 7,454,070 | B2 | | 11/2008 | Ito et al. | 382/232 |
| 7,466,863 | B2 | | 12/2008 | Ito | 382/232 |
| 7,561,749 | B2 | | 7/2009 | Tamura et al. | 382/239 |
| 7,616,822 | B2 | | 11/2009 | Ito et al. | 382/239 |
| 7,627,181 | B2 | | 12/2009 | Tamura et al. | 382/232 |
| 7,653,254 | B2 | | 1/2010 | Ito et al. | 382/239 |
| 7,680,345 | B2 | | 3/2010 | Ito et al. | 382/232 |
| 8,126,270 | B2 | * | 2/2012 | Iinuma | 382/178 |
| 2007/0206867 | A1 | | 9/2007 | Tamura et al. | 382/232 |
| 2007/0230810 | A1 | | 10/2007 | Kanatsu | 382/243 |
| 2008/0037882 | A1 | | 2/2008 | Tamura et al. | 382/232 |

(Continued)

FOREIGN PATENT DOCUMENTS

JP    2006-344069 A    12/2006

(Continued)

*Primary Examiner* — Amir Alavi
(74) *Attorney, Agent, or Firm* — Fitzpatrick, Cella, Harper & Scinto

(57) ABSTRACT

Image processing by which both of high compressibility and high image quality are achieved, and in which characters in character regions and graphics in graphic regions are vectorized. If a pixel of a character in a character region overlaps with a graphic in a graphic region, graphic region vectorization is performed first, whereas if a pixel of a character in the character region does not overlap with a graphic in the graphic region, character region vectorization is performed first.

8 Claims, 18 Drawing Sheets

U.S. PATENT DOCUMENTS

| | | | |
|---|---|---|---|
| 2008/0260273 A1 | 10/2008 | Ito et al. | 382/245 |
| 2009/0252232 A1 | 10/2009 | Kishi et al. | 375/240.24 |
| 2009/0252427 A1 | 10/2009 | Kishi et al. | 382/244 |
| 2009/0274363 A1* | 11/2009 | Dai | 382/164 |
| 2009/0274369 A1* | 11/2009 | Sano et al. | 382/182 |
| 2009/0279781 A1* | 11/2009 | Kitabatake | 382/176 |
| 2010/0034478 A1 | 2/2010 | Kajiwara et al. | 382/248 |
| 2010/0202025 A1* | 8/2010 | Ito et al. | 358/448 |

FOREIGN PATENT DOCUMENTS

| | | |
|---|---|---|
| JP | 2007-272601 A | 10/2007 |
| WO | 2006/066325 A1 | 6/2006 |

* cited by examiner

```
<Document>
<Page>
<Image x="0" y="0" width="2480" height="3520"
       xlink:href="data:image/jpeg;base64,9jaskjsdhk463oeSDxq32x3
xS234DxSnlu34xDXNHLNL..."/>

<Image x="1472" y="358" width="556" height="603"
xlink:href="data:image/jpeg;base64,/9j4AAQSkzJasdsDqQDACA2EQFDS
Kj3hawhhd4425FRgAB..."/>
..
<Vector x="447" y="631" width="328" height="429" >
  <Path c="#642312" d="M00 10.5 0.512 1l1 115 2.5l1 1vl1-6.0 1h-
5.0vl1...1-1.0 0.5z"/>
</Vector>
..
<Vector c="#000000" x="494" y="774" width="32" height="40">
  <Path d="M0 0 h5vl1-1.0 lh-1.0vl1-1.0... 7h8v-6.0h-8.0z"/>
</Vector>
..
</Page>
</Document>
```

IMAGE PROCESSING WITH PREFERENTIAL VECTORIZATION OF CHARACTER AND GRAPHIC REGIONS

BACKGROUND OF THE INVENTION

1. Field of the Invention

The present invention relates to an image processing apparatus, image processing method, program, and storage medium that computerize paper documents.

2. Description of the Related Art

In recent years, computerization of information has been advancing, and consequently there is widely used a system that scans a paper document with a scanner to computerize it, stores the computerized document as an electronic file, and transmits the electronic file to other devices.

In the system transmitting an electronic file to other devices as described, an electronic file obtained by computerizing a document is required to have high compressibility in order to reduce transmission cost.

The electronic file is also required to have reusability that enables the electronic file to be partially edited, and high image quality property that prevents image quality from degrading even if the image in the electronic file is enlarged or reduced.

However, when both of a character region and a graphic region (a region containing a photograph, etc.) are present in an electronic file, there are following problems. That is, when compression (lossless compression such as MMR compression) suitable for the character region of the electronic file is performed, image quality of the character region is high but a compression ratio of the electronic file is low. On the other hand, when compression (lossy compression such as JPEG compression) suitable for the graphic region of the electronic file, a compression ratio of the electronic file is high but characters are degraded.

For this reason, an approach as described below is disclosed in Japanese Patent Laid Open No. 2007-272601. In the approach according to Japanese Patent Laid Open No. 2007-272601, an electronic file is divided into a character region, a line drawing region, a graphic region, and the like, and the character and line drawing regions are converted into pieces of vector data. Regions and the like that cannot be easily reproduced by vectorization (conversion into vector data) are compressed in JPEG, and compression results of the respective regions are synthesized and outputted.

However, when a character region of an electronic file is constantly vectorized, even if the character region is present within a graphic region of the electronic file, the character region will be vectorized. Then, the vectorized portion of the character region is subjected to filling processing in order to increase a compression ratio of the graphic region serving as a background of the character region. This may degrade image quality of the graphic region.

Also, in an approach according to Japanese Patent Laid Open No. 2007-272601, when regions are subjected to separating processing, each of the regions is defined as a rectangle to thereby allow easy clipping of the region. However, in the case of clipping out and processing the region on the basis of the rectangle, a graphic region may contain a character region. In such a case, vector data obtained by vectorizing the graphic data may be degraded. This is because a processing method for converting the character region into vector data and a processing method for converting the graphic region into vector data are different from each other.

The aforementioned problem will be explained with reference to FIG. 19. FIG. 19(*a*) illustrates a rectangular graphic region clipped out of an input image. FIG. 19(*b*) illustrates a state where a character region contained in the graphic region of FIG. 19(*a*) has been converted into vector data. In FIG. 19(*b*), the character region having been converted into the vector data is displayed with being superimposed on the graphic region having been subjected to filling processing. FIG. 19(*c*) is a diagram in which only the graphic region not containing the character region is extracted from the graphic region of FIG. 19(*b*), and we assume that a portion corresponding to the character region having been converted into the vector data is subjected to the filling processing with, for example, an average value of pixels near the character region, or the like. At this time, image quality of the graphic region may degrade. For example, when there is a pattern in a background near the character region, difference between the filled portion and its surrounding portion is likely to become significant, and the image quality is likely to degrade. FIG. 19(*d*) is a diagram in which the character region clipped out of FIG. 19(*a*) is converted into the vector data, and corresponds to the character region of FIG. 19(*b*). As illustrated in FIG. 19(*c*), when the character region within the graphic region is subjected to the filling processing, the image quality of the graphic region may degrade.

The present invention is made in view of the aforementioned problems, and has an object to achieve both of high compressibility and high image quality property of an electronic file that contains a character region and a graphic region.

SUMMARY OF THE INVENTION

To solve the aforementioned problems, an image processing apparatus according to the present invention comprises: a region analysis unit that analyzes region of an input image; a character region vectorization unit that vectorizes a character region; a graphic region vectorization unit that vectorizes a graphic region; and a determining unit that determines, on the basis a result of the region analysis by the region analysis unit, which of processing by the character region vectorization unit and processing by the graphic region vectorization unit is first performed, wherein if the determining unit determines that a pixel of a character in the character region overlaps with a graphic in the graphic region, the determining unit performs control so as to first perform the processing by the graphic region vectorization unit, and if the determining unit determines that the pixel of the character in the character region does not overlap with the graphic in the graphic region, the determining unit performs the control so as to first perform the processing by the character region vectorization unit.

According to the present invention, both of high compressibility and high image quality property of an electronic file are achieved to increase user friendliness of the electronic file. Further features of the present invention will become apparent from the following description of exemplary embodiments with reference to the attached drawings.

Further features of the present invention will become apparent from the following description of exemplary embodiments (with reference to the attached drawings).

BRIEF DESCRIPTION OF THE DRAWINGS

FIG. 10 is a diagram illustrating an example of an electronic file generated according to an XML format;

DESCRIPTION OF THE EMBODIMENTS

Embodiment 1

Embodiment 1 will be explained in detail below with reference to the drawings.

Figure 1:
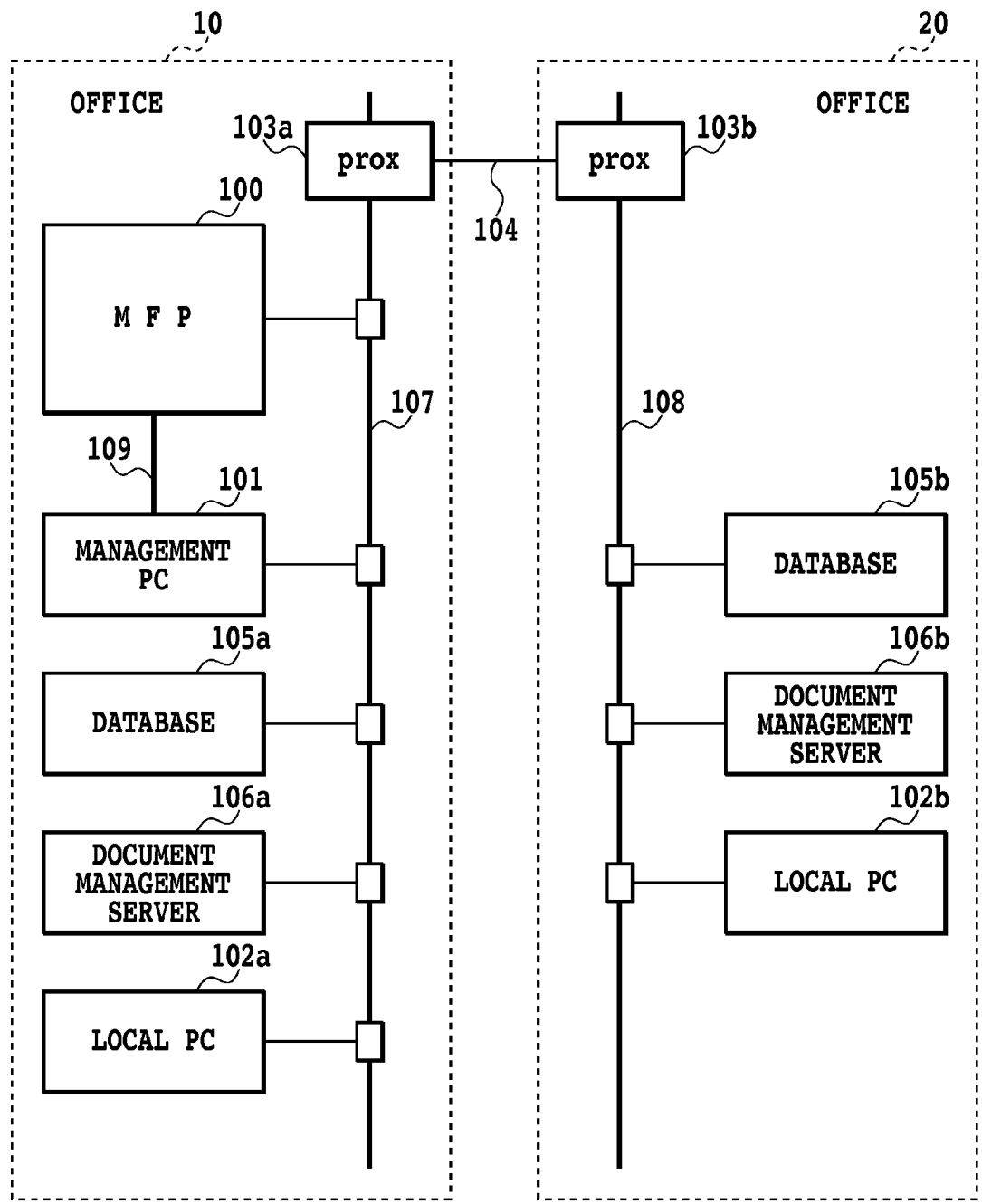
FIG. 1 is a block diagram illustrating an image processing apparatus according to the present invention.

FIG. 1 is a block diagram illustrating an image processing apparatus according to the present invention. As illustrated in FIG. 1, offices 10 and 20 are connected through the Internet 104.

A LAN 107 constructed within the office 10 is connected with an MFP (a complex machine) 100, a management PC 101 that controls the MFP 100, a local PC 102a, a document management server 106a, and a database 105a for the document management server 106a.

A LAN 108 constructed within the office 20 is connected with a document management server 106b, and a database 105b for the document management server 106b.

The LAN 107 is connected with a proxy server 103a, and connected to the Internet 109 through the proxy server 103a.

The LAN 108 is connected with a proxy server 103b, and connected to the Internet 104 through the proxy server 103b.

The MFP 100 has functions of: reading a paper document to perform image processing; transmitting a result of the image processing to the management PC 101 via a LAN 109; and transmitting the result of the image processing to the local PC 102a via the LAN 107 or to a general purpose PC that is not illustrated. The MFP 100 also has a function of interpreting Page Description Language (PDL) transmitted from the local PC 102a or the general purpose PC (not illustrated) to print it out. Further, the MFP 100 may have a copy function of reading a paper document, and performing image processing for copying to print it out.

The management PC 101 is a commonly used computer. Note that, in this embodiment, processing such as undermentioned registration processing is performed in the database 105a via the management PC 101; however, the processing performed in the management PC 101 may be performed in the MFP 100.

Further, as illustrated in FIG. 1, the MFP 100 is directly connected to the management PC 101 through the LAN 109.

Figure 2:
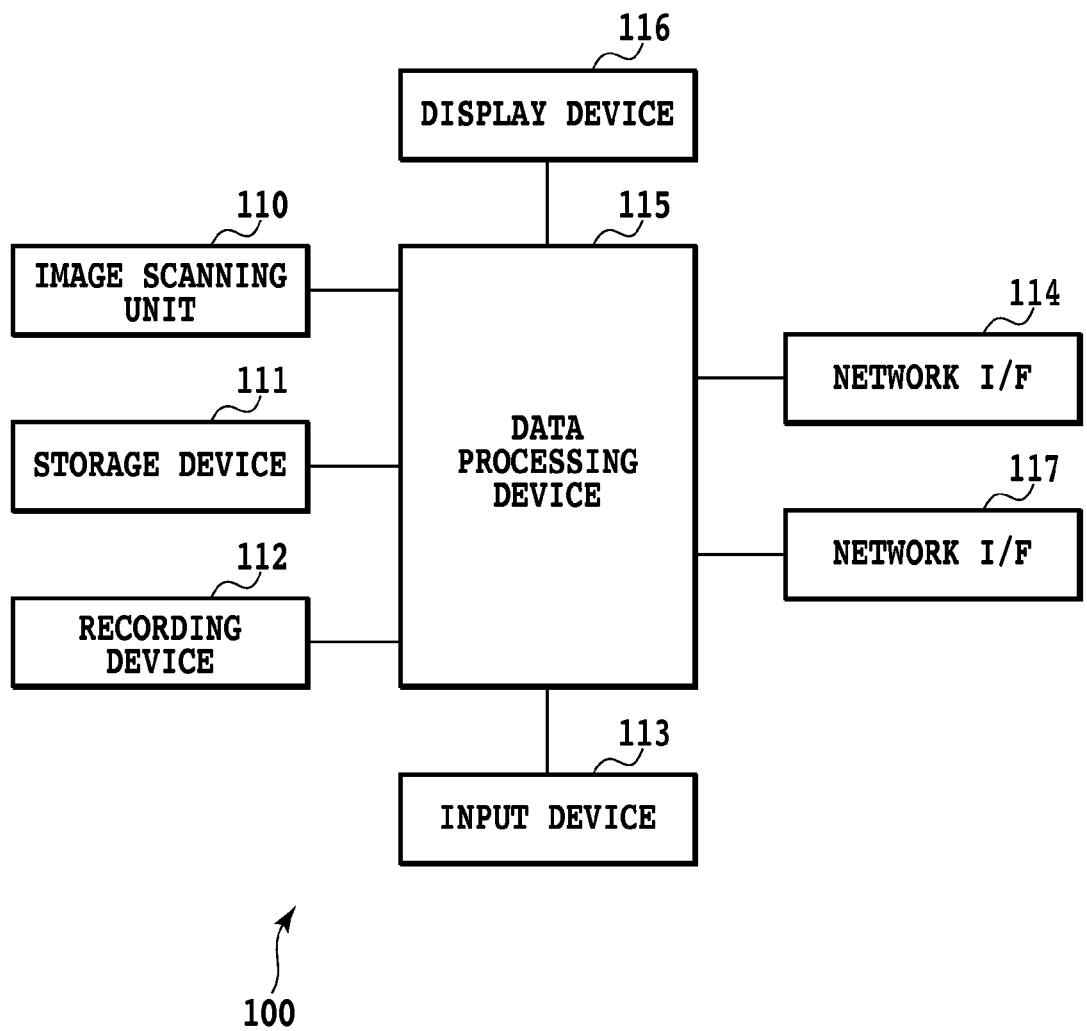
FIG. 2 is a block diagram illustrating details of an MFP 100 of FIG. 1.

FIG. 2 is a block diagram illustrating details of the MFP 100 in FIG. 1.

In FIG. 2, the MFP 100 includes an image scanning unit 110 having an Auto Document Feeder (ADF) (not illustrated). The image scanning unit 110 irradiates an original document with a light source, and focuses a reflected image on a solid state imaging device. The solid state imaging device generates an image scanning signal with a predetermined resolution (e.g., 600 dpi) and a predetermined luminance level (e.g., 8 bits), and produces an image formed by raster data from the image scanning signal.

The MFP 100 further includes a storage device (BOX) 111 and a recording device 112, and when performing the ordinary copy function, performs image processing for the copying to convert a processing result into a recording signal through a data processing device 115. When the MFP 100 produces a plurality of copies, it once stores in the BOX 111 the recording signals each corresponding to one page, and sequentially outputs them to the recording device 112 to form a recording image on a recording paper.

The MFP 100 further includes a network I/F (interface) 114 for making a connection to the LAN 107 in FIG. 1. The MFP 100 can record PDL data, which is outputted by the MFP 100 with use of a driver of the local PC 102a or another general purpose PC (not illustrated) via the network I/F 114, in the recording device 112. The PDL data outputted by the MFP 100 through the driver of the local PC 102a is transmitted through the LAN 107 and network I/F 114 to the data processing device 115, where the PDL data is converted into a recordable recording signal. Then, the recording signal is recorded on the recording paper in the MFP 100.

The BOX 111 can store data that is obtained by rendering data from the image scanning unit 110 and the PDL data outputted via the driver from the local PC 102a.

The MFP 100 is operated via a key operation unit (an input device 113) provided in the MFP 100, or an input device (a keyboard, a pointing device, etc.) of the management PC 101. The data processing device 115 performs control for operating them.

The MFP100 further includes a display device 116, and by using the display device 116, displays an input state achieved by the operation of the key operation unit or input device, and an image to be processed.

The management PC 101 can directly control the BOX 111 via a network I/F 117. The LAN 109 is used for transmission/reception of data and control signal between the MFP 100 and the management PC 101.

As illustrated in FIG. 2, the data processing device 115 is connected with the image scanning unit 110, storage device 111, and recording device 112. Also, the data processing device 115 is connected with the display device 116, network I/F 114, network I/F117, and input device 113.

Figure 3:
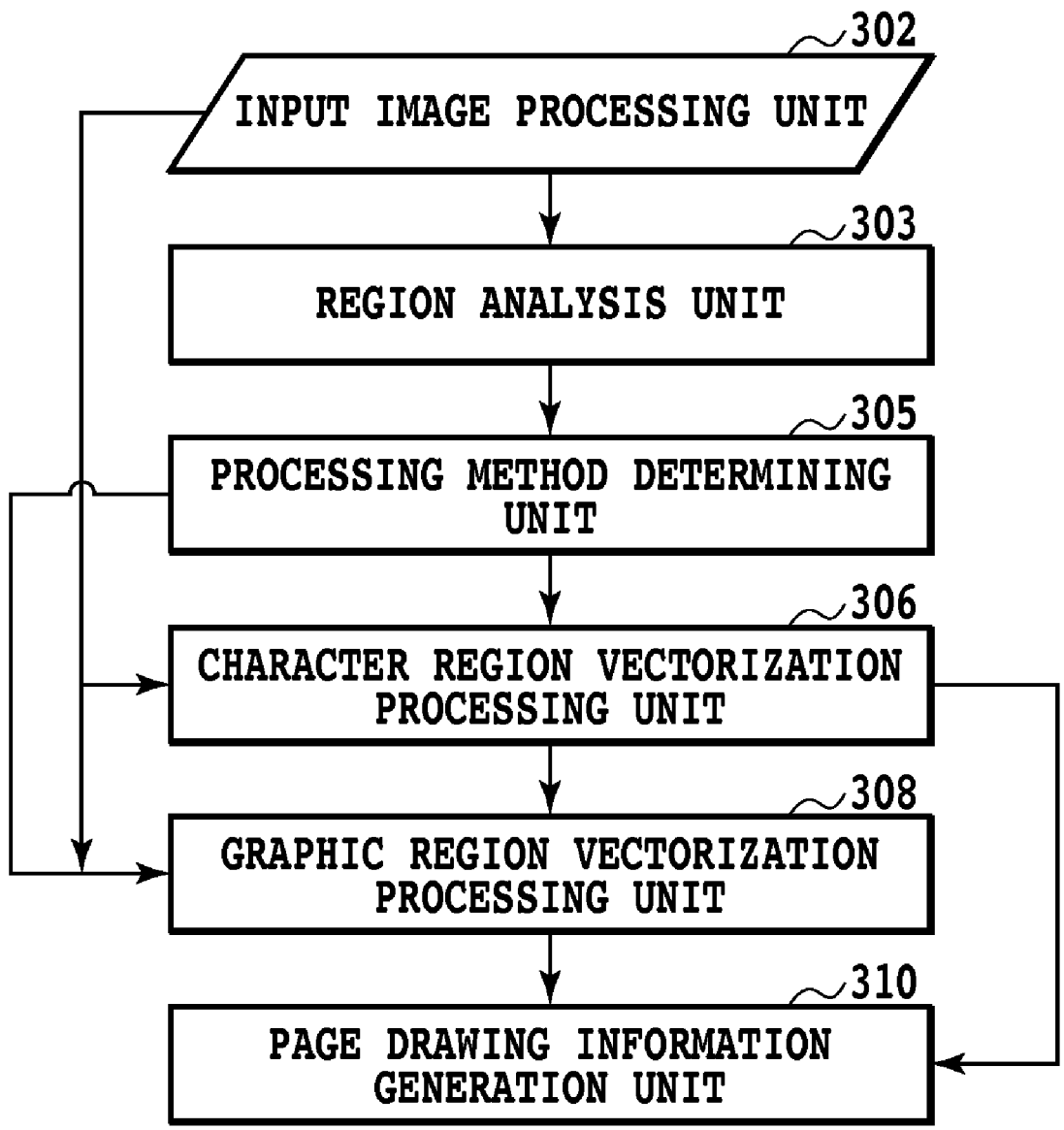
FIG. 3 is a block diagram for explaining a configuration that performs processing according to Embodiment 1.

FIG. 3 is a block diagram for explaining a configuration of the MFP 100 that performs processing according to Embodiment 1.

The configuration illustrated in FIG. 3 will be explained in detail below.

First, an input image processing unit 302 receives input of an image. That is, the input image processing unit 302 is inputted with the image. Subsequently, the input image processing unit 302 performs well known image processing of the input image, depending on the input image. Note that the well known image processing is, for example, color conversion or filtering processing, but may be image processing other than the color conversion or filtering processing.

A region analysis unit 303 receives from the input image processing unit 302 the image that has been subjected to the image processing; performs region analysis of the image; determines a character region, a graphic region, and the like in the image; and divides the image into a plurality of regions. Note that the region analysis unit 303 may use a publicly known art that region divides a color image as disclosed in, for example, International Patent Laid Open No. WO2006/066325.

The region analysis unit 303 has attribute information such as a color connected component, character, line drawing, photograph, chart, frame, and page background, and position information, and generates region information in which a relationship between regions is represented as a tree structure. Note that a result of the image processing for each of the regions within the image is also recorded in the region information.

A processing method determining unit 305 determines a method for the image processing on the basis of a state of the aforementioned tree structure of regions. Details of the processing performed by the processing method determining unit 305 will be described later.

A character region vectorization processing unit 306 converts the image received from the input image processing unit 302 to a grayscale image with a resolution of 600 dpi in which only Y in luminance information is extracted. Then, the character region vectorization processing unit 306 generates an image for character region vectorization processing (an image for character region vectorization processing) to perform the character region vectorization processing.

The character region vectorization processing will be explained in detail below.

First, binarization processing of the character region is performed to generate a binary image. A black pixel connected component (a black pixel block) within the character region is extracted from the region information generated by the region analysis unit 303, and then an outer contour of the black pixel connected component is converted into vector data.

Figure 4:
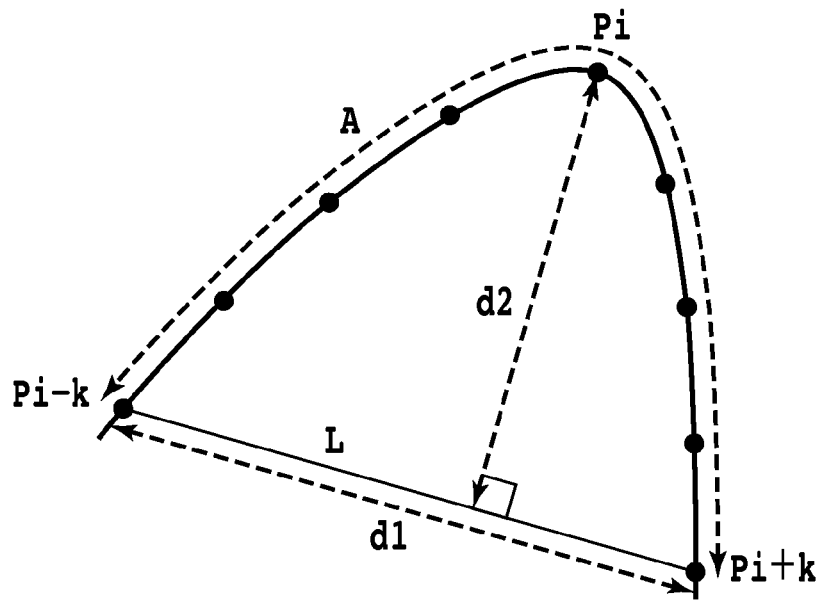
FIG. 4 is a diagram explaining vectorization.

Specifically, "an angle" that sections a contour line into a plurality of sections (pixel string) is first detected in order to represent the connected component of the character region by a combination of straight lines and/or curved lines. Note that the "angle" refers to a point where curvature takes a local maximum. For example, the determination whether or not a pixel Pi on a curved line in FIG. 4 is an angle is made as follows:

First, Pi is set as a starting point, and then pixels Pi−k and Pi+k apart from Pi by predetermined pixels (e.g., k pixels) in directions opposite to each other along the curved line are connected by a line segment L. Then, a distance between the pixels Pi−k and Pi+k is denoted by d1; a distance between the line segment L and the pixel. Pi by d2; and a length of an arc between the pixels Pi−k and Pi+k by A. If d2 takes a local maximum, or a ratio (d1/A) is less than or equal to a threshold value, the pixel Pi is determined as the angle.

The pixel string divided by the angle is approximated by a straight line or curved line. The approximation of the pixel string to the straight line is performed by the least square method or the like, and the approximation of the pixel string to the curved line is performed by a cubic spline function or the like. Note that the pixel corresponding to the angle that divides the pixel string serves as a start point or an end point of the approximated straight or curved line.

After the vectorization of the outer contour of the connected component, it is further determined whether or not there is an inner contour of a white pixel block inside the vectorized contour. If it is determined that there is the inner contour, the inner contour is vectorized, and vector data based on the inner contour is obtained. Then, in the manner taking into account an inner contour inside the inner contour, inner contours of reversed pixels are recursively vectorized.

As described above, an outline of the character region is vectorized by using the segmented line approximation of the contour of the connected component. Note that, at this time, color information of the characters (a character color) is obtained based on a pixel value on the input image corresponding to a position of the black pixel block. A line drawing can be converted into vector data in the same approach.

Figure 5:
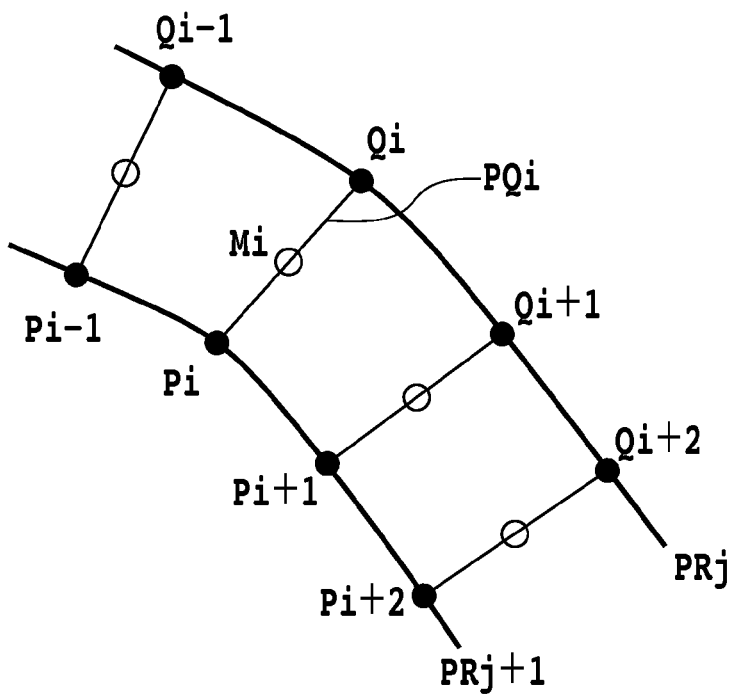
FIG. 5 is a diagram explaining vectorization of a line having some thickness.

Also, as illustrated in FIG. 5, when an outer contour PRj, and an inner contour PRj+1 or another outer contour are close to each other in a section of interest, two or more contour lines can be combined and represented as one line having some thickness. For example, distances PiQi between respective pixels Pi on the contour PRj+1 and respective pixels Qi on the contour PRj that are the closest from the respective pixels Pi are calculated, and if a variation in PiQi is small, the section of interest can be approximated by a straight or curved line along a point stream of midpoints Mi between the respective pixels Pi and Qi. In this case, the thickness of the approximated straight or curved line can be, for example, an average value of the distances PiQi.

Lines and table ruled lines that are a group of lines can be efficiently vectorized by grouping lines having some thickness.

A character vector that combines the vector data converted in the aforementioned way and the color information of the connected component is recorded as region information.

Also, the character region vectorization processing unit 306 performs character region filling processing for the character region.

In this embodiment, a publicly known method for painting the character region with an average color of pixels surrounding the character region is used as the character region filling processing. The character region filling processing will be explained below.

First, the pixel connected component of the character region is extracted from the region information, and developed as an image in a character region filling memory. Then, a pixel position of the image developed in the character region filling memory and a position of an image for graphic region vectorization processing are overlapped to specify a character region in the graphic region vectorization processing image.

Subsequently, the average color of the pixels surrounding the character region in the image for graphic region vectorization processing is calculated.

Finally, the character region in the image for graphic region vectorization processing is painted with the calculated average color. This generates an image for graphic region vectorization processing in which the character region is painted with the surrounding background color and no character is present.

A graphic region vectorization processing unit 308 generates the aforementioned image for graphic region vectorization processing. Since color information is important in processing a graphic region, a color image with a medium resolution is suitable for the image for graphic region vectorization processing.

The graphic region vectorization processing unit 308 converts an input image to an image with a resolution of 300 dpi in the format of Y:Cr:Cb=4:1:1 to generate the image for graphic region vectorization processing, and then vectorize a graphic region of the image.

The graphic region vectorization processing will be explained below with reference to FIG. 6.

Figure 6:
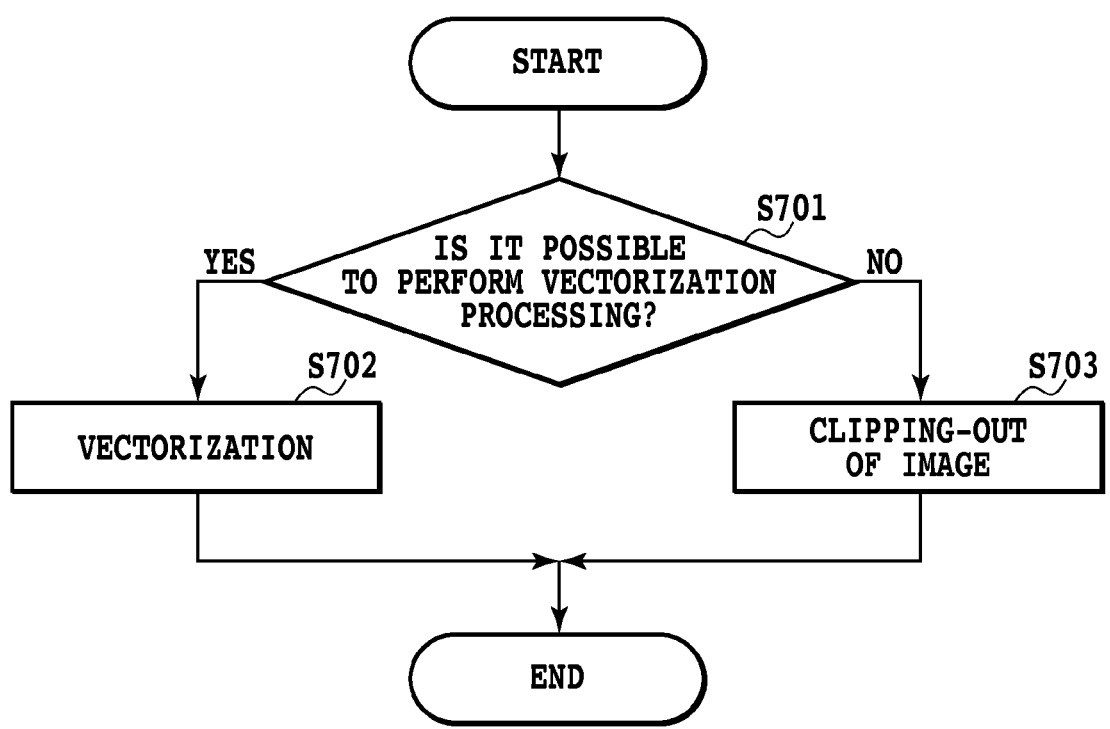
FIG. 6 is a flowchart for deciding processing of a graphic region.

First, in step S701 of FIG. 6, the graphic region vectorization processing unit 308 determines based on the region information of a corresponding graphic region whether or not the image for graphic region vectorization processing in the region can be vectorized.

If it is determined in step S701 that the graphic region vectorization processing image can be vectorized, the processing flow proceeds to step S702. If it is determined in step S701 that the image for graphic region vectorization processing cannot be vectorized, the processing flow proceeds to step S703.

Specifically, for example, in step S701, an attribute of the region information of the graphic region is referred to, and if the attribute corresponds to a line drawing, a clip art (an illustration containing the limited number of colors (e.g. 32 colors)), or a chart, it may be determined that the image for graphic region vectorization processing can be vectorized.

Alternatively, for example, in step S701, if an area of the graphic region where a color quantization result is determined as excessive division has more than or equal to a certain value, it may be determined in consideration of a calculation amount and processing speed of the vectorization that the image for graphic region vectorization processing cannot be vectorized.

In step S702, the graphic region vectorization processing is performed. As an example of the graphic region vectorization processing performed in step S702, processing disclosed in Japanese Patent Laid Open No. 2006-344069 will be explained below with reference to FIG. 7.

Figure 7:
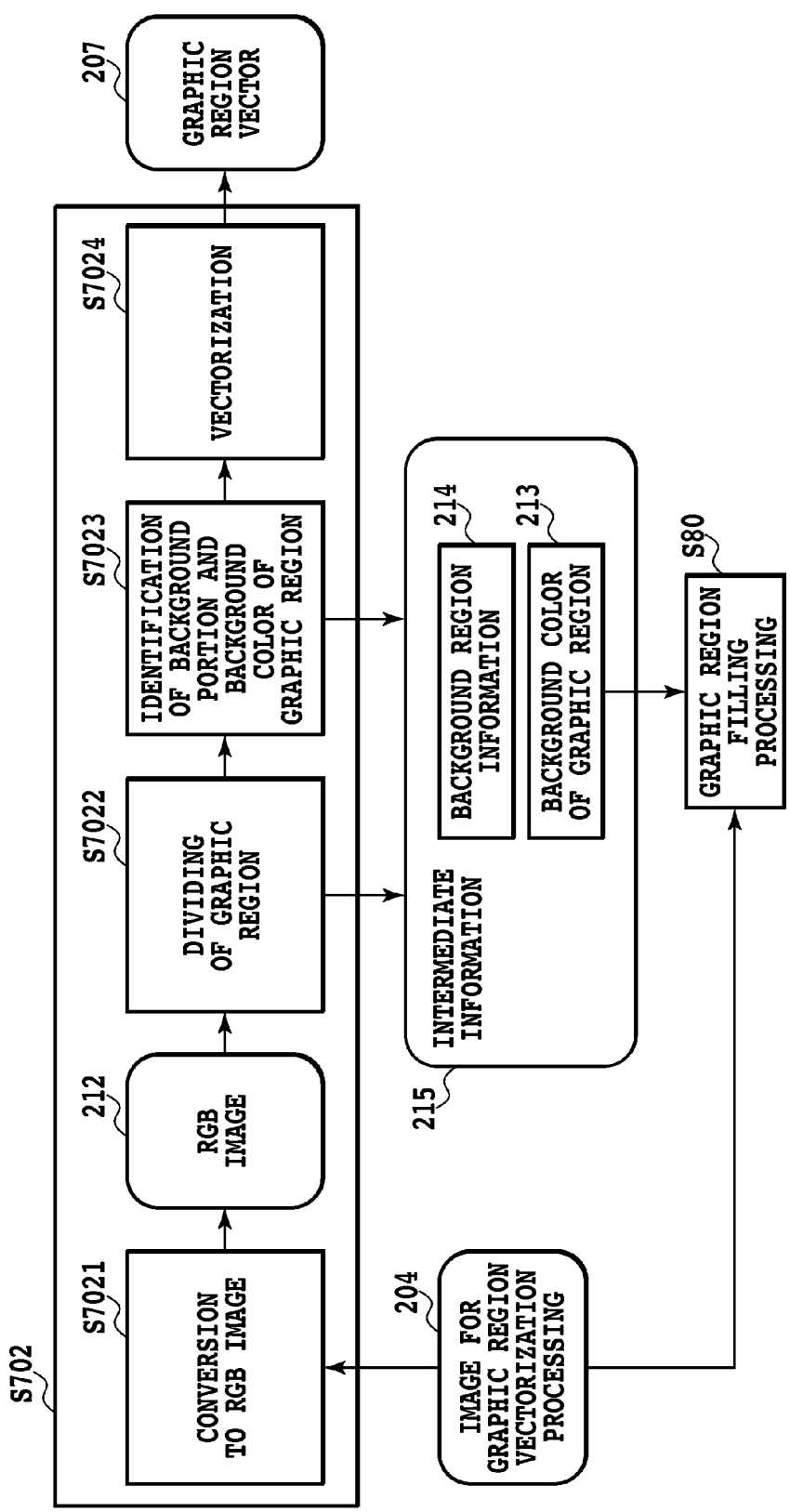
FIG. 7 is a block flowchart explaining graphic region vectorization processing.

Steps S7021 to S7024 of FIG. 7 describe details of the graphic region vectorization processing performed in step S702.

First, in step S7021, an image in which resolutions of at least one or more color components of a plurality of color components are low is restored to an image with the same resolution as that of the input image.

In this embodiment, as an example, an image for graphic region vectorization processing 204 is one having Y:Cb:Cr=4: 1:1, which is converted to an RGB image 212 with a high resolution in step S7021.

Then, in step S7022, pixels in a graphic region are divided into a plurality of regions on the basis of characteristics of colors of the pixels.

Subsequently, in step S7023, a background portion and background color of the graphic region are identified based on a result of dividing the graphic region in step S7022.

After that, in step S7024, a portion other than the background portion of the graphic region is vectorized based on a result of the identification obtained by the processing performed in step S7023, and thereby a graphic region vector 207 is generated.

Intermediate information 215 in FIG. 7 retains various kinds of information that are generated during the series of processing in steps S7022 and S7023. The intermediate information 215 includes, for example, background region information 214 on the graphic region that is obtained by the identification processing in step S7023. Also, the intermediate information 215 includes, for example, a background color of graphic region 213 that is obtained by the identification processing in step S7023.

Note that the intermediate information 215 may include information other than the background region information 214 and the background color of the graphic region 213.

The background region information 214 and background color of graphic region 213 are used in graphic region filling processing S80 illustrated in FIG. 8, which will be described later. In the graphic region filling processing, a portion corresponding to a graphic vectorized region within the graphic region is subjected to the filling processing as will be described later.

Meanwhile, in step S703 of FIG. 6, image clipping processing is performed. That is, in step S703, a rectangular image is clipped out of the image for graphic region vectorization processing 204.

The graphic region vector 207 generated in step S7024 and the rectangular image clipped out in step S703 are recorded in the storage device 111 as region information.

Details of the filling processing S80 for the case where the graphic region has been vectorized will be explained below mainly with reference to FIGS. 8 and 11.

Figure 11:
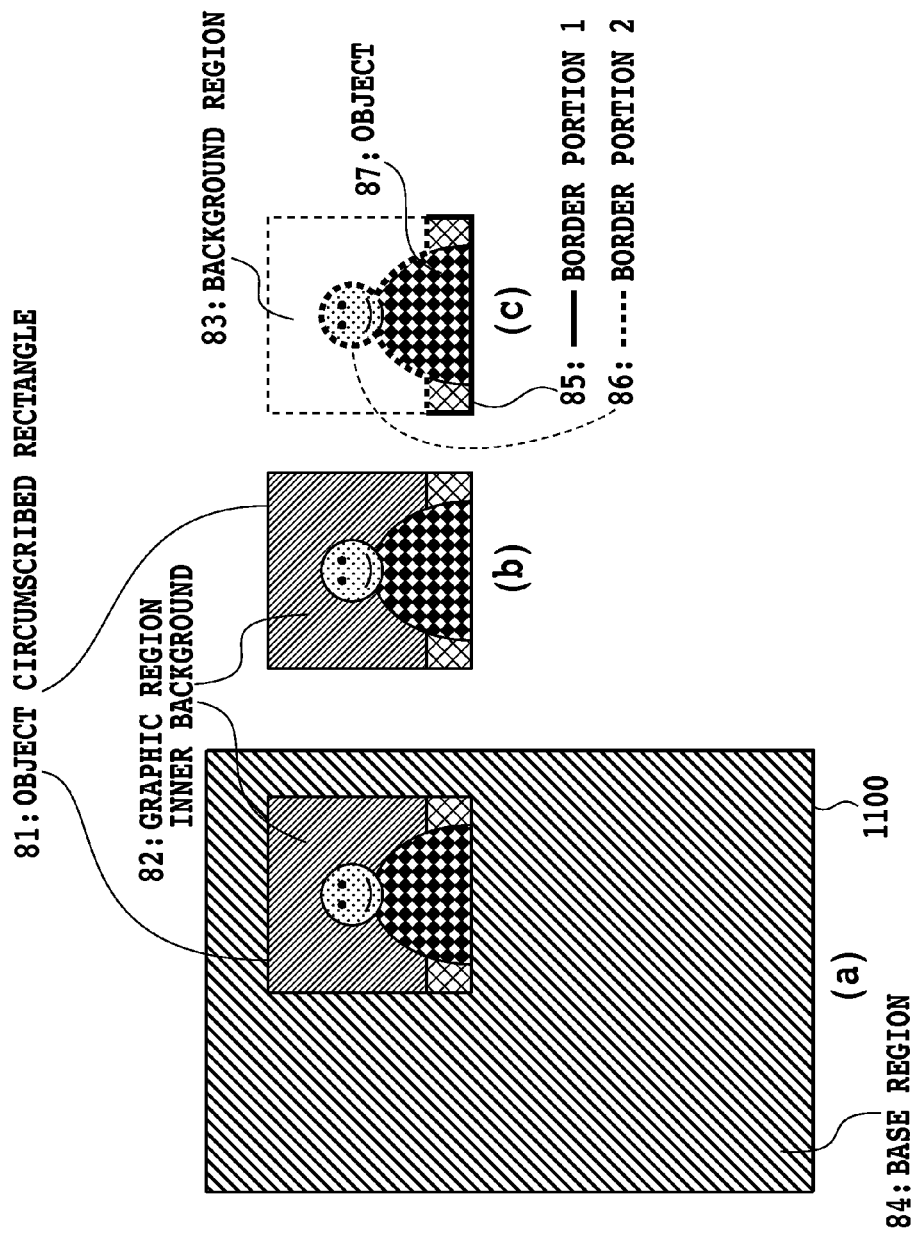
FIG. 11 are diagrams illustrating an example of an image that contains a graphic region.

FIG. 11(*a*) illustrates, as an example, an image 1100 that contains a graphic region.

FIG. 11(*b*) illustrates an object circumscribed rectangle 81 that contains the graphic region extracted for vectorization. Also, a background region 83 is one that has been identified by a result of dividing the graphic region into a plurality of regions on the basis of the similarities of colors.

In FIGS. 11(*a*) and 11(*b*), a graphic region inner background 82 refers to a background within the graphic region.

FIG. 11(*c*) is a diagram illustrating only an object 87 other than the background region 83 in the graphic region. In FIG. 11(*c*), a border portion 1 (85) is a border between the object 87 and a base region 84 of the image 1100. Also, in FIG. 11(*c*), a border portion 2 (86) is a border between the object 87 and the background region 83.

Figure 8:
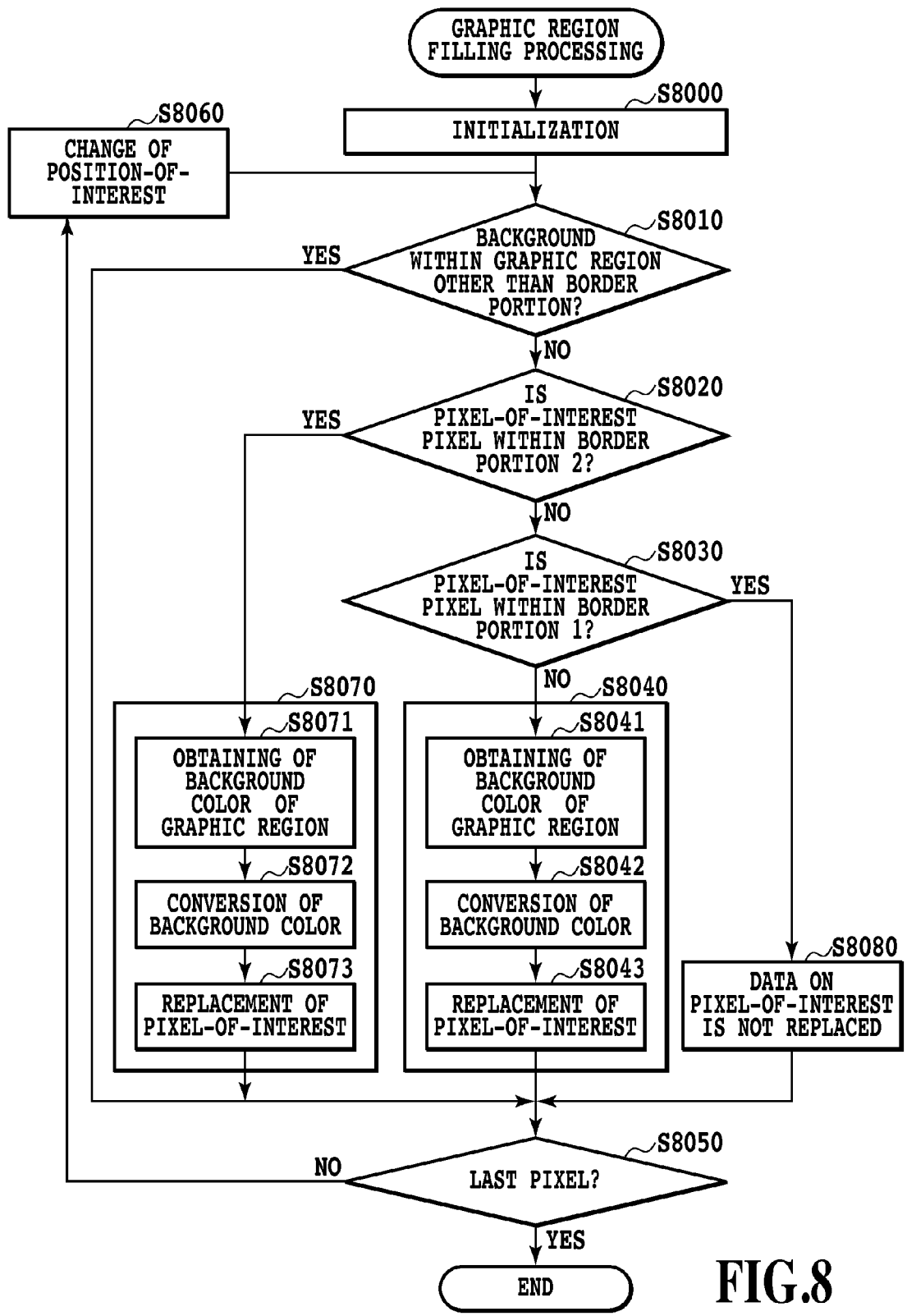
FIG. 8 is a flowchart explaining graphic region filling processing.

FIG. 8 is a diagram illustrating a flowchart of the graphic region filling processing. FIG. 8 will be explained below in detail. For example, the filling processing illustrated in FIG. 8 can be applied to the image 1100 that contains the graphic region illustrated in FIG. 11 as an example.

First, in step S8000 of FIG. 8, initialization processing is performed. In the initialization processing in step S8000, a background mask image is generated from the background region information 214, and retained in the intermediate information 215.

Note that the background mask image refers to an image generated as a binary image bit map that is increased in resolution and generated on the one pixel one bit basis, in which it is possible to distinguish between the background region 82 and the other region in the graphic region on the basis of whether a pixel value is 1 or 0.

In step S8000, the background color of the graphic region 213 of the image 1100 is ensured in the intermediate information 215.

At this time, there is performed a series of initialization processing to prepare for processing an image corresponding to the graphic region of the image 1100 in a raster scan sequence.

After the initialization processing in step S8000 is completed, the processing flow proceeds to step S8010.

In step S8010, the filling processing of the partial image corresponding to the graphic region of the image 1100 starts in the raster scan sequence.

First, in step S8010, Cb data of the image for graphic region vectorization processing 204 is raster scanned. It is determined whether or not a pixel at a position-of-interest at the time in the raster scan sequence is one that is not within the border portion 1 (85) or border portion 2 (86) but is within the graphic region inner background 82 in FIG. 11.

The one pixel at the position-of-interest in the raster scan sequence of the image for graphic region vectorization processing 209 corresponds to 2×2 pixels of a corresponding portion of the background mask image generated in step S8000.

For this purpose, for example, it may be determined in step S8010 whether or not all of the four pixels of the 2×2 pixels of the corresponding portion of the background mask image are within the graphic region inner background 82.

If it is determined in step S8010 that the pixel at the position-of-interest is one present within the graphic region inner background 82, the processing flow proceeds to step S8050. That is, the pixel value within the graphic region inner background 82 is retained without change.

If it is determined in step S8010 that the pixel at the position-of-interest is one not present within the graphic region inner background 82, the processing flow proceeds to step S8020.

In step S8020, it is determined whether or not the pixel-of-interest is one present within the border portion 2 (86) of FIG. 11.

In step S8020, the following processing may be performed. That is, it may be determined whether or not any of the 2×2 (=4) pixels of the background mask image corresponding to the pixel-of-interest at the position-of-interest in the raster scan sequence is within the graphic region inner background 82, and the rest of the 4 pixels are within a region other than the graphic region inner background 82.

If it is determined in step S8020 that the pixel-of-interest is one present within the border portion 2 (86), the processing flow proceeds to step S8071. If it is determined in step S8020 that the pixel-of-interest is one not present within the border portion 2 (86), the processing flow proceeds to step S8030.

In step S8030 it is determined whether or not the pixel-of-interest is one present within the border portion 1 (85) of FIG. 11.

In step S8030, the following processing may be performed. That is, it may be determined whether or not any of the 2×2 (=4) pixels of the background mask image corresponding to the pixel-of-interest at the position-of-interest in the raster scan sequence is a pixel of the object 87, and any of the rest of the 4 pixels is within the base region 84.

If it is determined in step S8030 that the pixel-of-interest is one present within the border portion 1 (85), the processing flow proceeds to step S8080. If it is determined in step S8030 that the pixel-of-interest is one not present within the border portion 1 (85), the processing flow proceeds to step S8041.

Next, in step S8041, the background color of the graphic region 213 is obtained from the intermediate information. The background color of the graphic region 213 may retain RGB data.

Then, in step S8042, the background color of the graphic region 213 is converted. In this step, for example, the RGB data is converted to YCrCb data.

Subsequently, in step S8043, all of Cb data, Cr data and Y data of the pixel-of-interest are replaced.

After that, in step S8050, it is determined whether or not processing of the graphic region in the raster scan sequence has proceeded to the last pixel in the graphic region.

If it is determined in step S8050 that the processing has proceeded to the last pixel, the processing flow is completed.

If it is determined in step S8050 that the processing has not proceeded to the last pixel, the processing flow proceeds to step S8060.

In step S8060, a position-of-interest at the time in the raster scan sequence on the Cb data of the image for graphic region vectorization processing 204 is advanced to the next position-of-interest, and then, the processing flow proceeds to step S8010.

In step S8071, the background color of the graphic region 213 is obtained from the intermediate information. Note that the background color of the graphic region 213 may retain RGB data.

Then, in step S8072, the background color of the graphic region 213 is converted. In this step, for example, the RGB data is converted to YCrCb data.

Subsequently, in step S8073, only Cb data and Cr data of the pixel-of-interest are replaced.

After the processing in step S8073 is completed, the processing flow proceeds to step S8050.

In step S8080, Y data, Cb data, and Cr data of a pixel-of-interest at a position-of-interest at the time in the raster scan sequence on the image for graphic region vectorization processing 204 are not replaced but retained as unchanged values.

After the processing in step S8080 is completed, the processing flow proceeds to step S8050.

As described above, the description of the graphic region filling processing with use of the image processing apparatus according to the present invention is completed.

Figure 9:
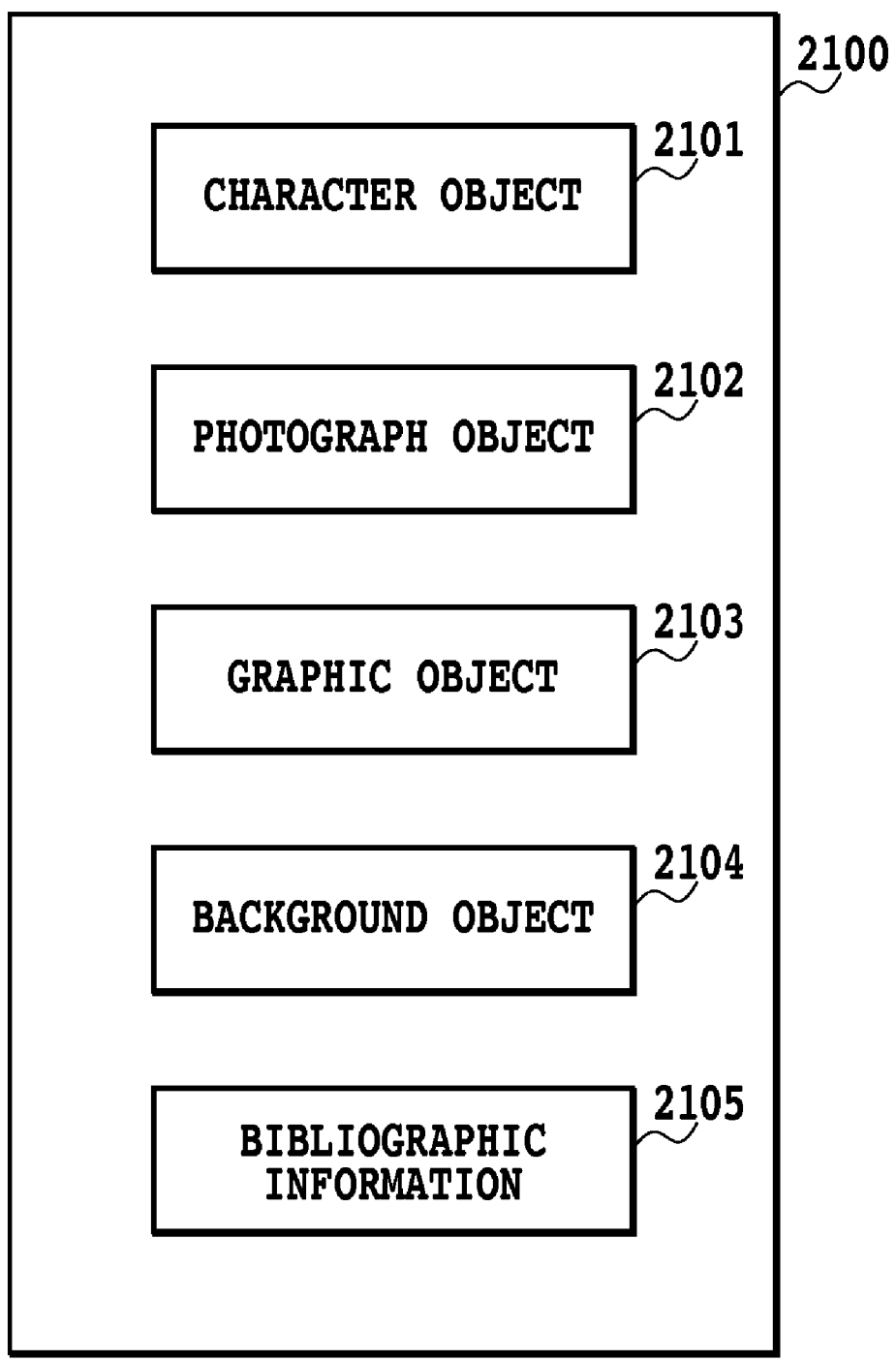
FIG. 9 is a diagram illustrating an example of data generated by page drawing information generation processing.

A page drawing information generation unit 310 in FIG. 3 generates, for example, page drawing information illustrated in FIG. 9.

FIG. 9 illustrates an example of data generated in the page drawing information generation unit 310.

In the page drawing information 2100 of FIG. 9, an example of an entire configuration of the data generated in the page drawing information generation unit 310 is illustrated.

In FIG. 9, a character object 2101 retains a vectorization result of a region that has been determined as a character by the region analysis unit 303 in FIG. 3, and information on a position in an image. Similarly, a photograph object 2102, graphic object 2103, and background object 2104 respectively have vectorization results of regions that have been determined as a photograph, graphic, and page background, and pieces of information on positions in the image.

Bibliographic information 2105 in FIG. 9 retains bibliographic information of input data. The bibliographic information 2105 retains, for example, the number of pages, page size, input device information, and time stamp.

The page drawing information generation unit 310 converts the generated page drawing information into an electronic file.

Note that the page drawing information generation unit 310 may convert the generated page drawing information into, for example, an electronic file that can be reproduced and edited in the local PCs 102a and 102b in FIG. 1.

FIG. 10 is a diagram illustrating an electronic file 2110, which is an example of an electronic file generated according to an XML format that can be used in this embodiment.

A description 2111 in FIG. 10 is one according to the XML format that draws an image of the background object 2104 in FIG. 9 over the whole of one page.

A description 2112 in FIG. 10 is one according to the XML format that draws the photograph object 2102 in FIG. 9 in a specified place within the page.

A description 2113 in FIG. 10 is one according to the XML format that draws the graphic object 2103 in a specified place within the page.

A description 2114 in FIG. 10 is one according to the XML format that draws the character object 2101 in a specified place within the page.

In the local PCs 102*a* and 102*b* of FIG. 1 that have received the electronic file in FIG. 10, the pieces of information described in the descriptions 2111 to 2114 can be drawn in sequence. This enables the local PCs 102*a* and 102*b* in FIG. 1 to configure the page having the same appearance as that of an original document by overlapping vectors of a background, photograph, and graphic, and a vector of a character. Also, each of the descriptions 2111 to 2114 can be used as an object for editing.

Note that the electronic file 2110 illustrated in FIG. 10 is merely an example, and another description format that is opened to the public may be used for the description of the electronic file. For example, a graphic page description such as PDF, XPS, or SVG, a page edit data description such as Office Open XML, Open Document Format, or the like may be used for the description of the electronic file.

Figure 12:
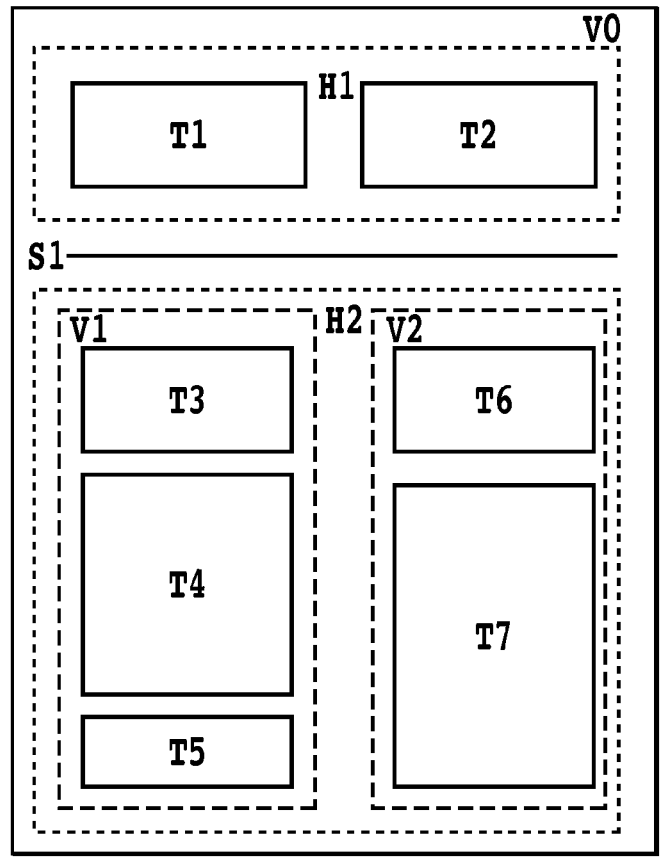
FIG. 12 is a diagram illustrating an image.
Figure 13:
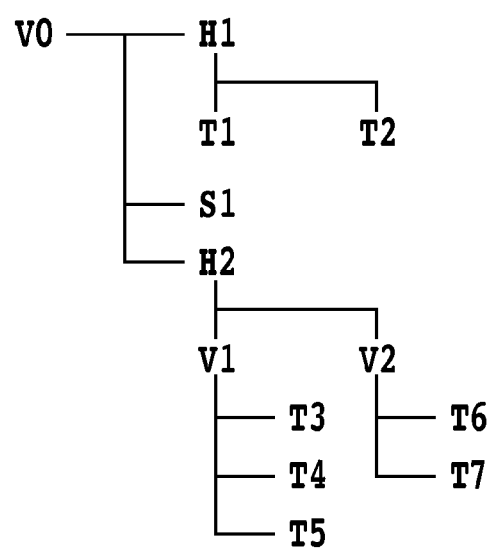
FIG. 13 is a diagram illustrating a tree structure.

Next, the tree structure representing the relationship between regions will be explained below with reference to FIGS. 12 and 13. FIG. 12 illustrates an example of a result of dividing an image which will be subjected to generation processing of the tree structure representing the relationship between regions. FIG. 13 illustrates the tree structure representing the relationship between regions.

In the example of FIG. 12, rectangular blocks T1 and T2 are laterally arranged in parallel at the top. Below the rectangular blocks T1 and T2, there is a lateral separator S1, and below the lateral separator S1, there are rectangular blocks T3, T4, T5, T6, and T7.

In FIG. 12, the rectangular blocks T3, T4 and T5 are vertically arranged from top to bottom within the left half of a region below the lateral separator S1, and the rectangular blocks T6 and T7 are vertically arranged from top to bottom within the right half of the region below the lateral separator S1.

The aforementioned processing result is registered as a region information tree structure in FIG. 13.

In FIG. 13, an input image V0 has groups H1 and H2 and the separator S1 in the uppermost hierarchical layer; and the rectangular blocks T1 and T2 of the second hierarchical layer belong to the group H1.

Groups V1 and V2 of the second hierarchical layer belong to the group H2; the rectangular blocks T3, T4, and T5 of the third hierarchical layer belong to the group V1; and the rectangular blocks T6 and T7 of the third hierarchical layer belong to the group V2.

Next, the processing method determining unit 305 in FIG. 3 will be explained with reference to FIGS. 14 to 16.

Figure 14:
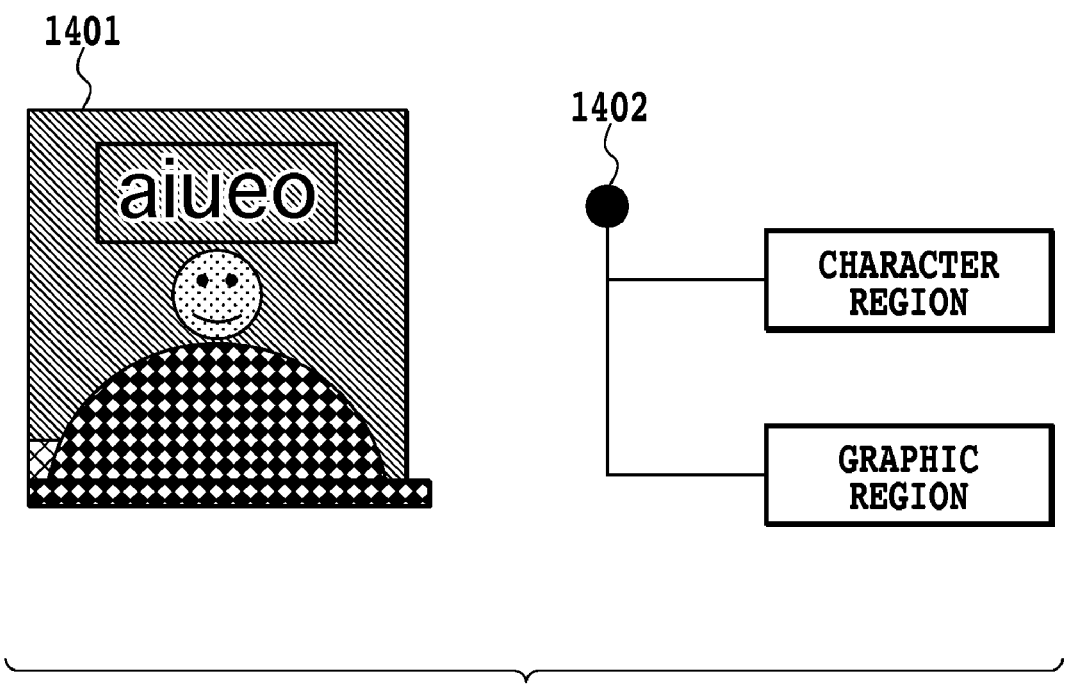
FIG. 14 is a diagram illustrating an example of a region analysis result.

A region analysis result 1401 of an image illustrated in FIG. 14 has a graphic region and a character region. A tree structure 1402 represents a relationship between the regions in the region analysis result 1401 of the image. In the example illustrated in FIG. 14, the graphic region and the character region overlap with each other.

The processing method determining unit 305 in FIG. 3 analyzes a tree structure to determine whether or not regions overlap with each other. In the example illustrated in FIG. 14, the character region is present within the graphic region. In this case, pixels of the graphic and character regions are mixed, and therefore, for an image corresponding to a region containing both of the graphic and character regions, the processing method determining unit 305 is adapted to perform the graphic region vectorization processing also for the character region.

Figure 15:
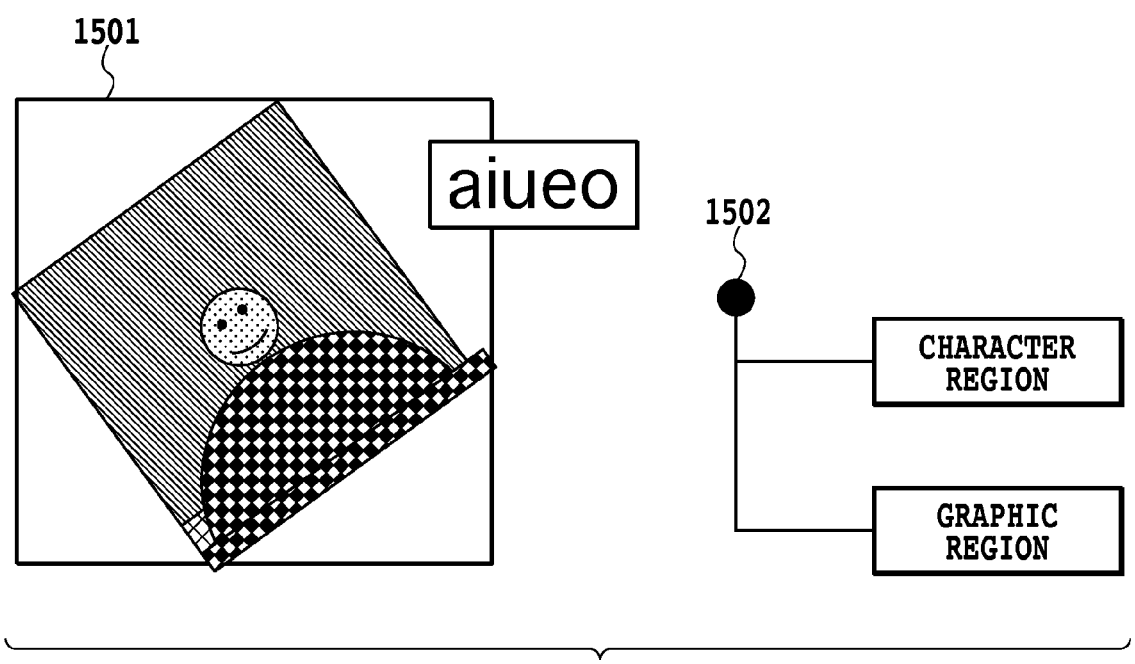
FIG. 15 is a diagram illustrating an example of the region analysis result.

FIG. 15 illustrates a region analysis result 1501 of an image where an overlapping manner between the character and graphic regions is different form that in FIG. 14. A tree structure 1502 represents a relationship between the regions in the region analysis result 1501 of the image. From the tree structure 1502, it turns out that, in the region analysis result 1501 of the image, the graphic and character regions overlap with each other. However, in the example illustrated in FIG. 15, the region analysis result 1501 of the image is represented as a rectangle, and therefore, if a portion where an actual graphic region exists is not a rectangle, the portion not corresponding to the actual graphic region is also dealt with as the graphic region, and determined as overlapping with the character region. In the example illustrated in FIG. 15, the character region is determined from the tree structure 1502 as overlapping with the graphic region; however, differently from the case of FIG. 14, pixels of the character region, and pixels of the portion where the actual graphic exists can be dealt with separately. This is because region information includes position information of pixels constituting the character region, and therefore the pixels of the character region and the pixels of the graphic region can be dealt with separately. In this case, the character region vectorization processing is performed for the image of the character region, and then the graphic region vectorization processing is performed for the image of the graphic region.

Figure 16:
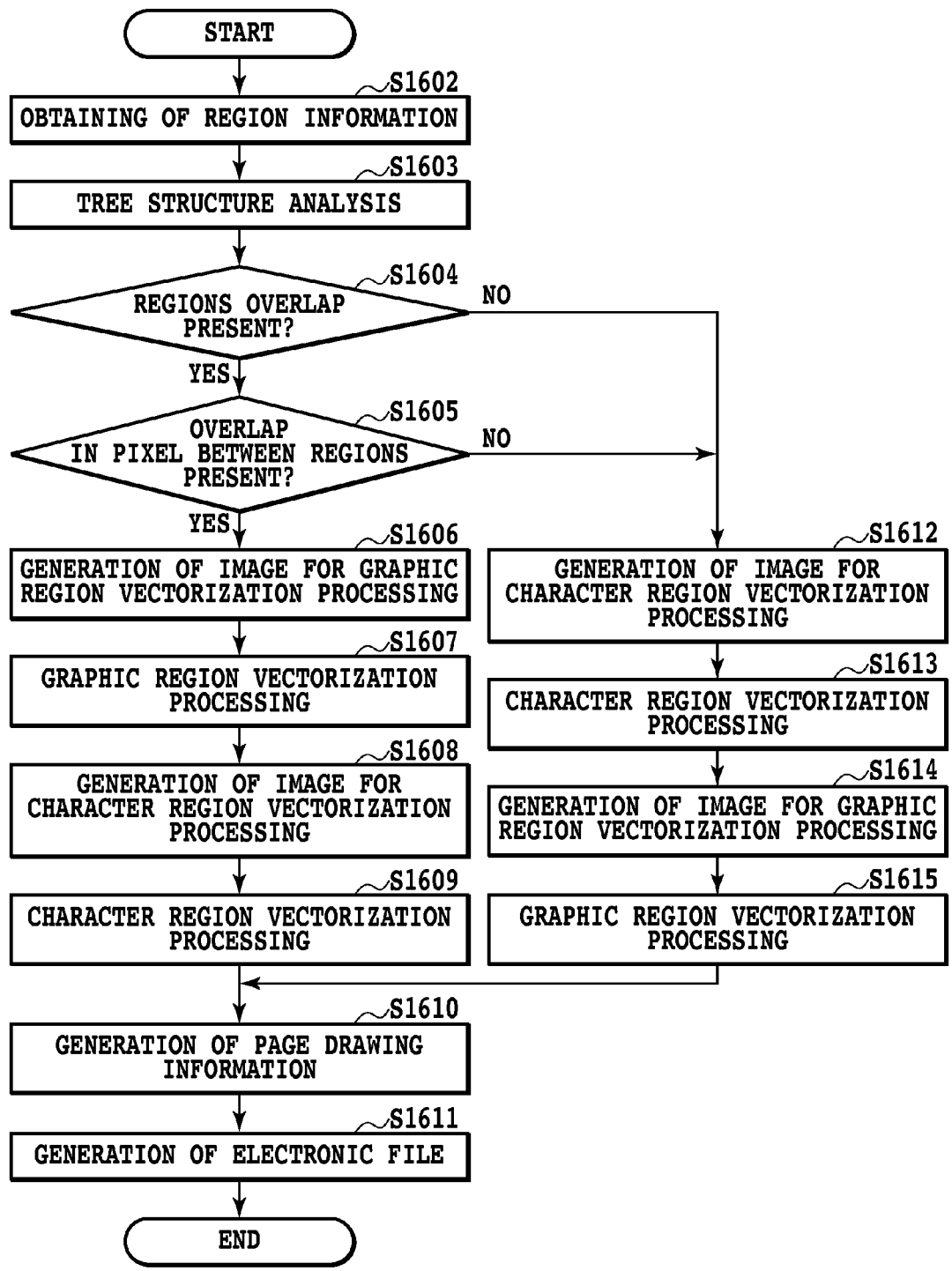
FIG. 16 is a flowchart performed by a processing method determining unit 305.

FIG. 16 illustrates a flowchart performed by the aforementioned processing method determining unit 305.

First, in step S1602 of FIG. 16, region information is obtained. In this step, information on a tree structure of regions as illustrated in FIGS. 14 and 15 is obtained.

Then, in step S1603, the tree structure obtained in step S1602 is analyzed to analyze a relationship between the regions, and in step S1604, it is determined whether or not the regions overlap with each other. Specifically, it is determined whether or not there is some overlap between a character region and a graphic region.

If it is determined in step S1604 that there is no overlap between the character region and the graphic region, the processing flow proceeds to step S1612. If it is determined in step S1604 that there is some overlap between the character region and the graphic region, the processing flow proceeds to step S1605.

In step S1605, it is determined whether or not there is some overlap between a pixel of a character contained in the character region and the graphic region that has an actual graphic. For example, as illustrated in FIG. 15, if it is determined that the pixel of the character does not directly overlap with the graphic, the processing flow proceeds to step S1612. On the other hand, as illustrated in FIG. 14, if it is determined that the pixel of the character contained in the character region overlaps with the actual graphic, the processing flow proceeds to step S1606.

In step S1606, a graphic region vectorization processing image is generated from the image containing the graphic and character regions.

Then, in step S1607, the graphic region vectorization processing is performed for the graphic region vectorization processing image that has been generated in step S1606. That is, if the graphic and the character overlap with each other, the graphic region vectorization processing of the graphic region is performed without filling processing of the character to generate vector data of the graphic region.

Subsequently, in step S1608, an image for character region vectorization processing is generated from the image containing only the character region.

After that, in step S1609, the character region vectorization processing is performed for the image for character region vectorization processing that has been generated in step S1608 to generate character vector data.

On the other hand, in step S1612, an image for character region vectorization processing is generated from the image containing only the character region.

Then, in step S1613, the character region vectorization processing is performed for the image for character region vectorization processing that has been generated in step S1612 to generate character vector data. At this time, the filling processing is performed for a portion containing a character pixel within the rectangular graphic region.

Subsequently, in step S1614, an image for graphic region vectorization processing is generated from the image in the rectangular graphic region that has been subjected to the filling processing.

After that, in step S1615, the graphic region vectorization processing is performed for the image for graphic region vectorization processing that has been generated in step S1614, and the processing flow proceeds to step S1610.

In step S1610, page drawing information is generated by using vector data. The vector data used in step S1610 includes the graphic region vector data generated in step S1607 and the character region vector data generated in step S1609. Alternatively, the vector data used in step S1610 includes the character region vector data generated in step S1613 and the graphic region vector data generated in step S1615.

Then, in step S1611, the page drawing information generated in step S1610 is converted to generate an electronic file.

That is, in the case where a character and a graphic overlap with each other, if the character vectorization processing and character filling processing are first performed, and then the graphic vectorization processing is performed, image quality of a graphic portion may be degraded due to image quality degradation by the character filling processing. Therefore, as mentioned above, this embodiment is configured such that, when a character and a graphic overlap with each other, the vectorization processing for the graphic region is first performed.

Embodiment 2

Embodiment 2 will be explained below with reference to FIG. 17.

Figure 17:
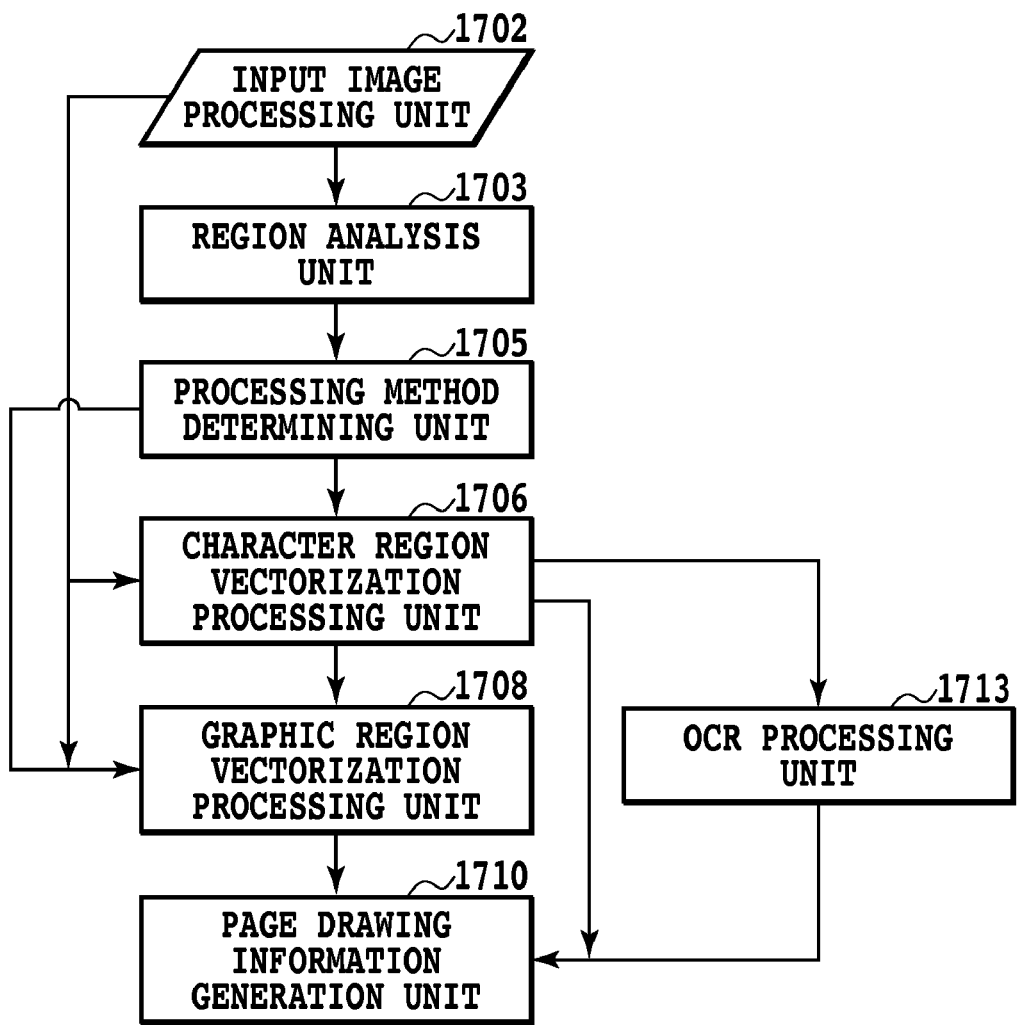
FIG. 17 is a block diagram for explaining a configuration that performs processing according to Embodiment 2.

FIG. 17 is a block diagram for explaining a configuration of the MFP 100 that performs processing according to Embodiment 2.

The configuration illustrated in FIG. 17 will be explained in detail below.

First, an input image processing unit 1702 receives image input. That is, the input image processing unit 1702 is inputted with an image. Then, the input image processing unit 1702 performs well known image processing for the input image, depending on the input image. The well known image processing is, for example, color conversion or filtering processing, but may be another image processing other than the color conversion or filtering processing.

A region analysis unit 1703 receives from the input image processing unit 1702 the image that has been subjected to the image processing, to perform region analysis for the image, and distinguishes a character region, a graphic region, and the like in the image to divide the regions. Note that the region analysis unit 1703 may use a publicly known art for dividing a color image into regions as disclosed in International Patent Laid Open No. WO2006/066325.

Also, the region analysis unit 1703 has attribute information such as a color connected component, character, line drawing, photograph, chart, frame, and page background, and position information, and generates region information in which a relationship between the regions is represented as a tree structure. At this time, an image processing result for each of the regions within the image is recorded in the region information.

A processing method determining unit 1705 determines a method for processing the image, on the basis of a state of the aforementioned tree structure of the regions. Details of the processing performed by the processing method determining unit 1705 will be explained later.

A character region vectorization processing unit 1706 converts the image received from the input image processing unit 1702 to a grayscale image having a resolution of 600 dpi in which only Y in luminance information is extracted. Then, the character region vectorization processing unit 1706 generates an image for character region vectorization processing (an image for character region vectorization processing) to perform the character region vectorization processing. The character region vectorization processing is performed as already explained with reference to FIGS. 4 and 5, for example.

Also, for the character region, the character region vectorization processing unit 1706 performs character region filling processing.

In this embodiment, as the character region filling processing, there is used a publicly known method in which a character region is painted with an average color of pixels surrounding the character region.

An OCR processing unit 1713 receives the image for character region vectorization processing from the character region vectorization processing unit to perform OCR (optical character recognition) processing of it.

A graphic region vectorization processing unit 1708 converts the image inputted from the input image processing unit 1702 to generate an image for graphic region vectorization processing suitable for graphic region vectorization processing. Since color information is important in processing a graphic region, a color image having a medium resolution is suitable for the image for graphic region vectorization processing.

The graphic region vectorization processing unit 1708 converts the input image to an image having a resolution of 300 dpi in the format of Y:Cr:Cb=4:1:1 to generate the image for graphic region vectorization processing, and then vectorizes the graphic region of the image.

Vectorization processing performed by the graphic region vectorization processing unit 1708 may be the same as that performed by the graphic region vectorization processing unit 308 according to Embodiment 1.

A page drawing information generation unit 1710 generates, for example, the page drawing information illustrated in FIG. 9.

The processing performed by the processing method determining unit 1705 of FIG. 17 will be explained in detail below with reference to FIG. 18.

Figure 18:
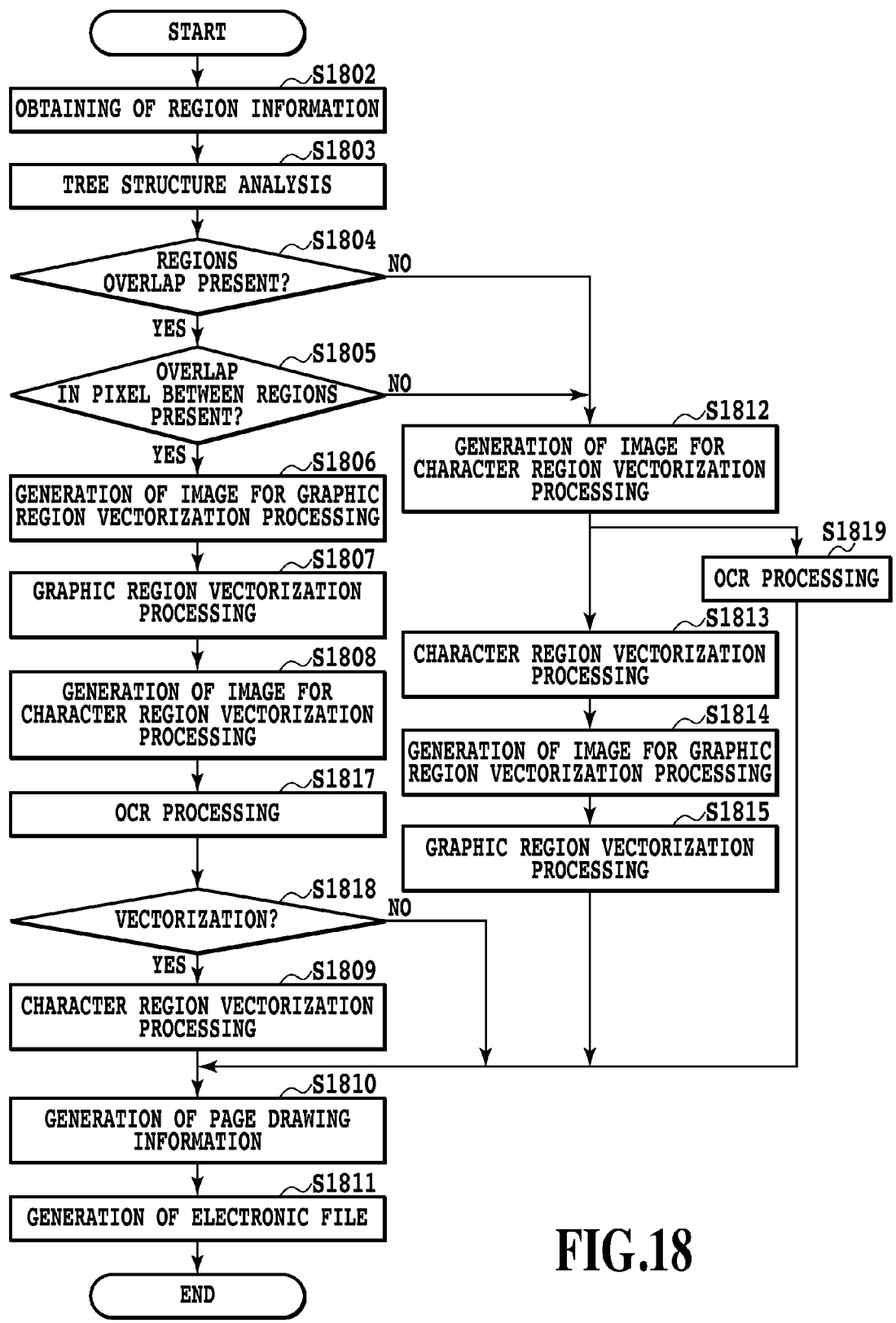
FIG. 18 is a flowchart performed by the processing method determining unit 305.
Figure 19:
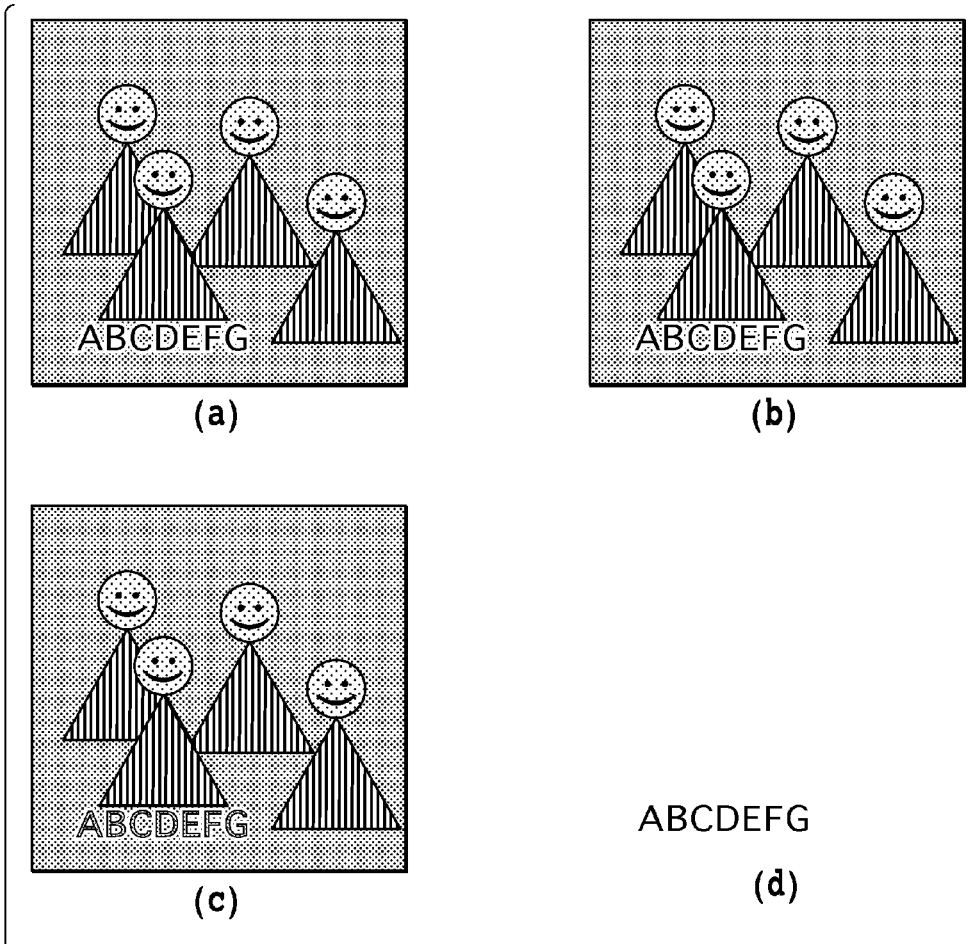
FIG. 19 is a diagram illustrating an example of a problem.

FIG. 18 illustrates a flowchart performed by the aforementioned processing method determining unit 1705.

First, in step S1802 of FIG. 18, the region information is obtained. In this step, the information on the tree structure of the regions as illustrated in FIGS. 14 and 15 is obtained.

Then, in step S1803, the tree structure obtained in step S1802 is analyzed to analyze the relationship between the regions. For example, the analysis as illustrated in FIGS. 14 and 15 is performed.

Subsequently, in step S1804, it is determined whether or not the regions overlap with each other. Specifically, it is determined whether or not there is some overlap between the character region and the graphic region.

If it is determined in step S1804 that there is no overlap between the character region and the graphic region, the processing flow proceeds to step S1812. If it is determined in step S1804 that there is some overlap between the character region and the graphic region, the processing flow proceeds to step S1805.

In step S1805, it is determined whether or not there is some overlap in pixel between a pixel of a character contained in the character region and the graphic region having an actual graphic. For example, as illustrated in FIG. 15, if it is determined that the pixel of the character does not directly overlap with the graphic, the processing flow proceeds to step S1812. On the other hand, as illustrated in FIG. 14, if it is determined that the pixel of the character contained in the character region overlaps with the actual graphic region, the processing flow proceeds to step S1806.

In step S1812, the image for character region vectorization processing is generated from the image containing only the character region.

Then, in step S1813, the character region vectorization processing is performed for the image for character region vectorization processing that has been generated in step S1812, to generate character vector data. At this time, the filling processing is performed for a portion containing a character pixel within the rectangular graphic region.

In step S1814, the image for graphic region vectorization processing is generated from the image in the rectangular graphic region that has been subjected to the filling processing.

Then, in step S1815, the graphic region vectorization processing is performed for the image for graphic region vectorization processing that has been generated in step S1814.

Also, separately from the series of processing performed in steps S1813 to S1815, in step S1819, the publicly known OCR (character encoding) processing is performed for the image for character region vectorization processing that has been generated in step S1812. The character vector data obtained in step S1813, graphic vector data generated by the processing in step S1815, and OCR data generated in step S1819 are used in step S1810 which will be described later.

On the other hand, in step S1806, the image for graphic region vectorization processing is generated from the image containing the graphic region and the character region.

Then, in step S1807, the graphic region vectorization processing is performed for the image for graphic region vectorization processing that has been generated in step S1806. That is, if the graphic and the character overlap with each other, the graphic region vectorization processing of the graphic region is performed without the filling processing of the character, to generate vector data of the graphic region.

Subsequently, in step S1808, the image for character region vectorization processing is generated from the image containing only the character region.

After that, in step S1817, the OCR (character encoding) processing is performed for the image for character region vectorization processing that has been generated in step S1808.

Then, in step S1818, it is determined whether or not the character region is vectorized. The determination in step S1818 can be made, for example, by referring to a register preliminarily storing a parameter in which whether or not the character region is vectorized is set.

If it is determined in step S1818 that the character region is vectorized, the character region vectorization processing is performed in step S1809, and then the processing flow proceeds to step S1810.

If it is determined in step S1818 that the character region is not vectorized, the processing flow proceeds to step S1810.

In step S1810, the page drawing information is generated based on vector data. The vector data used in step S1810 includes the character vector data generated in step S1813, graphic vector data generated in step S1815, and character code data as an OCR result that is generated in step S1819. Alternatively, the vector data used in step S1810 includes the graphic vector data generated in step S1807, character vector data generated in step S1809, and character code data as an OCR result that is generated in step S1817.

Then, in step S1811, the page drawing information generated in step S1810 is converted to generate an electronic file. At this time, the character code data as the OCR result is added to the electronic file as metadata.

As described above, as a result of the region analysis, a method for image processing can be adaptively switched in consideration of the relationship between the character region and the graphic region.

Figure 20:
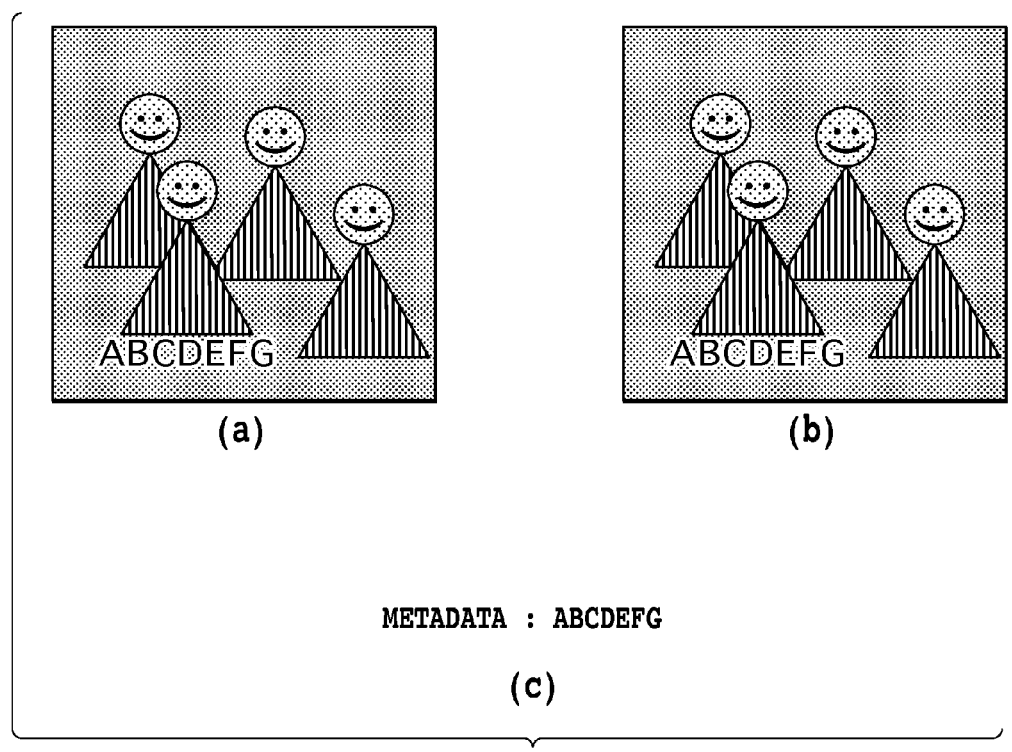
FIG. 20 is diagrams illustrating an example of an effect.

FIG. 20 illustrates an example of an effect obtained by Embodiment 1 or 2. FIG. 20(a) is a diagram in which a graphic region is clipped out. FIG. 20(b) illustrates an example of a result of processing applied with Embodiment 1 or 2, and an image in which when a character overlaps with a graphic, only the graphic region vectorization processing is performed without performing the filling processing of characters within the graphic region to perform conversion into one graphic vector data. FIG. 20(c) illustrates a character code recognized by OCR of the characters in the graphic region, and the character code is added, as metadata for the graphic region, to the electronic file generated in Embodiment 2. This provides the electronic file that achieves both of high compressibility and high image quality property to increase user friendliness.

Other Embodiments

Aspects of the present invention can also be realized by a computer of a system or apparatus (or devices such as a CPU or MPU) that reads out and executes a program recorded on a memory device to perform the functions of the above described embodiments, and by a method, the steps of which are performed by a computer of a system or apparatus by, for example, reading out and executing a program recorded on a memory device to perform the functions of the above described embodiments. For this purpose, the program is provided to the computer for example via a network or from a recording medium of various types serving as the memory device (e.g., computer readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-028583, filed Feb. 10, 2009, which is hereby incorporated by reference herein in its entirety.

What is claimed is:

1. An image processing apparatus comprising:
a region analysis unit that analyzes region of an input image;
a character region vectorization unit that vectorizes a character region;
a graphic region vectorization unit that vectorizes a graphic region; and
a determining unit that determines, on a basis of a result of the region analysis by the region analysis unit, which of processing by the character region vectorization unit and processing by the graphic region vectorization unit is first performed, wherein
if the determining unit determines that a pixel of a character in the character region overlaps with a graphic in the graphic region, the determining unit performs control so as to first perform the processing by the graphic region vectorization unit, and if the determining unit determines that the pixel of the character in the character region does not overlap with the graphic in the graphic region, the determining unit performs the control so as to first perform the processing by the character region vectorization unit.

2. The image processing apparatus according to claim 1, wherein the graphic region vectorization unit determines whether or not the graphic region can be subjected to vectorization processing, and if the graphic region vectorization unit determines that the graphic region can be subjected to the vectorization processing, the graphic region vectorization unit performs the vectorization processing of the graphic region to generate vector data.

3. The image processing apparatus according to claim 2, wherein if the graphic region vectorization unit determines that the graphic region cannot be subjected to the vectorization processing, the graphic region vectorization unit clips out the graphic region as an image.

4. The image processing apparatus according to claim 1, further comprising a character recognition unit that performs character recognition processing for the character region to generate a character code.

5. The image processing apparatus according to claim 1, further comprising an electronic file conversion unit that generates an electronic file including: vector data generated by the character region vectorization unit; and vector data generated by the graphic region vectorization unit.

6. The image processing apparatus according to claim 1, wherein the character region vectorization unit generates vector data on a basis of a contour of the character within the character region, and performs filling processing of a portion corresponding to the character.

7. An image processing method that is executed by an image processing apparatus, the method comprising:
a region analysis step for a region analysis unit to analyze region of an input image;
a determining step for a determining unit to determine, on a basis of a result of the region analysis in the region analysis step, which of processing by a character region vectorization unit and processing by a graphic region vectorization unit is first performed;
a character region vectorization step for the character region vectorization unit to vectorize a character region; and
a graphic region vectorization step for the graphic region vectorization unit to vectorize a graphic region, wherein
in the determining step, if it is determined that a pixel of a character in the character region overlaps with a graphic in the graphic region, control is performed so as to first perform the processing by the graphic region vectorization unit, and if it is determined that the pixel of the character in the character region does not overlap with the graphic in the graphic region, the control is performed so as to first perform the processing by the character region vectorization unit.

8. A non-transitory computer readable storage medium that stores a program for instructing a computer to function as:
a region analysis unit that analyzes region of an input image;
a character region vectorization unit that vectorizes a character region;
a graphic region vectorization unit that vectorizes a graphic region; and
a determining unit that determines, on a basis of a result of the region analysis by the region analysis unit, which of processing by the character region vectorization unit and processing by the graphic region vectorization unit is first performed, wherein
if the determining unit determines that a pixel of a character in the character region overlaps with a graphic in the graphic region, the determining unit performs control so as to first perform the processing by the graphic region vectorization unit, and if the determining unit determines that the pixel of the character in the character region does not overlap with the graphic in the graphic region, the determining unit performs the control so as to first perform the processing by the character region vectorization unit.

* * * * *